United States Patent [19]

Porter

[11] Patent Number: 4,945,623
[45] Date of Patent: Aug. 7, 1990

[54] METHOD OF REPAIRING A SEAL JOINTING FITTING REPAIR

[75] Inventor: Douglas S. Porter, Simsbury, Conn.

[73] Assignee: Combustion Engineering, Inc., Windsor, Conn.

[21] Appl. No.: 218,774

[22] Filed: Jul. 14, 1988

[51] Int. Cl.$^5$ .............................................. B23P 7/00
[52] U.S. Cl. ............................ 29/402.07; 29/402.18; 29/402.21
[58] Field of Search ............ 29/402.03, 402.06, 402.07, 29/402.08, 402.09, 402.11, 402.17, 402.18, 402.21

[56] References Cited

U.S. PATENT DOCUMENTS

| | | | |
|---|---|---|---|
| 1,926,517 | 9/1933 | Filippi et al. | 29/402.03 X |
| 1,975,495 | 10/1934 | Armacost | 29/402.03 X |
| 3,219,397 | 11/1965 | Heldenbrand et al. | 29/402.18 X |
| 3,928,029 | 12/1975 | Fisk et al. | 420/485 |
| 4,597,436 | 7/1986 | Hagemeister et al. | 29/157.4 X |
| 4,603,463 | 8/1986 | Wolbert et al. | 29/402.07 |

OTHER PUBLICATIONS

"Swagelok" Tube Fitting, pp. 2-3.

*Primary Examiner*—Mark Rosenbaum
*Assistant Examiner*—Frances Chin
*Attorney, Agent, or Firm*—John H. Mulholland

[57] ABSTRACT

A method of repairing leaky compression fitting seal joints between a pressure stub tube (22) projecting from a nuclear reactor head (12) and a cylindrical thermocouple body (24) concentrically mounted in the stub tube (22) for penetration of the reactor pressure boundary. The method includes the steps of loosening and disassembling compression fitting nuts (30,32) and fitting body (34) to expose, and remove by grinding, a cammed ferrule radial compression means (26,28), cleaning the surfaces to be sealed, axially telescoping a split collar (40) between the tube (22) and the thermocouple body (24) and providing split rings (44,46) of brazing material surrounding the thermocouple body adjacent the exposed ends of the tube (22) and the collar (40). Resistance heating the tube and, therefore, the brazing material and repositioning and reassembling the fitting body (22) and fitting nuts (30,32) to complete the repaired seal joint.

9 Claims, 1 Drawing Sheet

METHOD OF REPAIRING A SEAL JOINTING FITTING REPAIR

BACKGROUND OF THE INVENTION

The invention relates to the field of seal joints of nuclear reactor instrument penetrations. More particularly, the invention is a method of repairing a leaky seal joint between a pressure stub tube and a thermocouple concentrically mounted in the tube by means of a compression fitting.

Prior art seal joint structures for instrument penetration of reactor pressure barriers involve compression fittings having fitting bodies and nuts threaded thereon which radially cam swaging ferrules to clinch and seal an outer pressure stub tube and a thermocouple having a smaller outside diameter cylindrical surface than the inside diameter of the tube to provide a seal joint for the penetration. Typically, the penetration is through the reactor head and, in use, there is exposure of the sealed and jointed parts to elevated temperature, pressure and nuclear radiation. The fittings may, typically, be of the ferrule containing type sold under the trademark "Swagelok" by Crawford Fitting Company of Cleveland, Ohio, or sold under the trademark "Tylok" by Tylok International of Cleveland, Ohio.

The reactor head members of at least one manufacturer of nuclear reactor units, generally, have between 39 and 65 penetrations with compression seal joints. Leaky seal joints often cause contaminated water to spill onto the head area, contaminating this zone and complicating worker access thereto, thereby increasing worker rems or exposure to radiation time.

SUMMARY OF THE INVENTION

The invention is a method of fixing or repairing leaky seal joints made up of radial compression fittings between a stainless steel pressure stub tube and a cylindrical stainless steel instrument body such as a thermocouple body. Typically, the thermocouple is concentrically mounted in the tube by means of a compression fitting having radial compression means clinching both the tube and the thermocouple body by means of a swaging action on surrounding ferrules as they are cammed by the advancing movement of fitting nuts on the fitting body.

The novel repair method for defective or leaky compression seal joints comprises the steps of:

loosening and disassembling the fitting nuts axially from the fitting body, removing the ferrules from the thermocouple body by grinding, providing a split collar or sleeve between the tube inside and the cylindrical body outside, cleaning the surfaces to be sealed, providing split rings of brazing material surrounding the thermocouple body adjacent the exposed ends of the tube and the collar, heating the brazing material by electrical resistance heating of the tube, and repositioning and reassembling the fitting body and fitting nuts to complete the repaired seal joint.

DESCRIPTION OF THE PREFERRED EMBODIMENT

Figure 1:
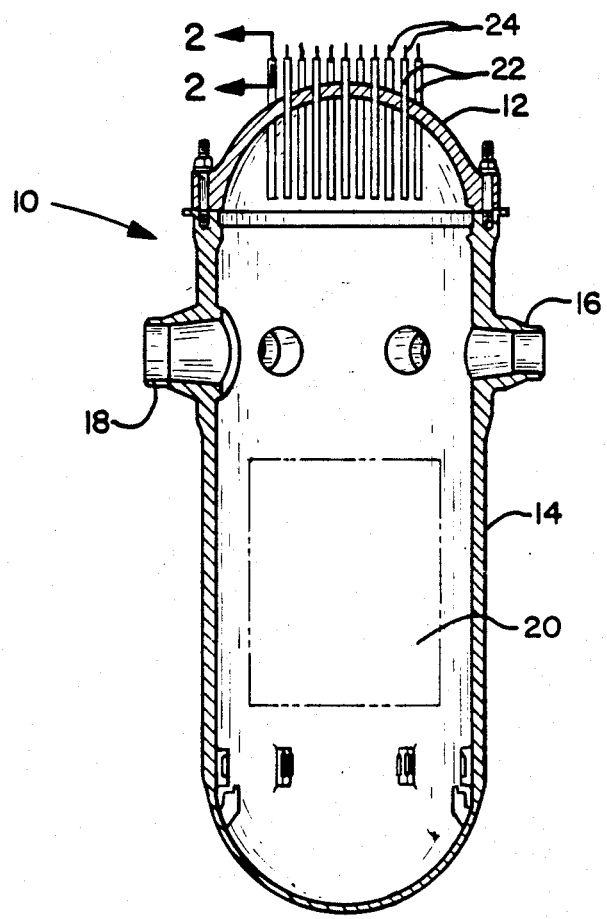
FIG. 1 is a schematic elevational view of a nuclear reactor including a bolted head member with a plurality of instrument penetrations.
Figure 2:
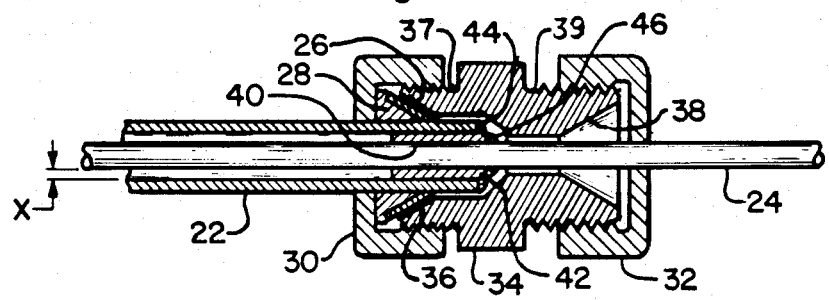
FIG. 2 is an enlarged cross-sectional elevational view taken along line 2—2 of FIG. 1 of a seal joint between a pressure stub tube of the type which penetrate the reactor head member of FIG. 1, and a thermocouple mounted therein, which seal joint has been repaired by the method of the invention.

The numeral 10 generally designates a pressurized water type of nuclear reactor (PWR) having a head member 12 bolted on the main vessel 14. Inlet nozzle 16 and outlet nozzle 18 are suitably connected to steam generators of the nuclear steam supply system. A nuclear core area 20 containing a plurality of fuel assemblies (not shown) is provided as are control element assemblies (not shown), a flow directing core barrel, flow skirt and other reactor internals and components (not shown), all of which are well known to those skilled in the art.

Penetrating the reactor head member are often both the control element assemblies and instrumentation pressure stub tubes or instrumentation nozzles 22 with instruments such as thermocouple 24 of cylindrical body shape. The thermocouple 24 has an outside body diameter smaller than the inside diameter of the tube 22 by an amount "x".

As originally installed according to the reactor manufacturer's design, a compression fitting having two compression fitting ends, one for tube 22 and one for thermocouple 24, includes pairs of radially gripping cammed ferrules 26 and 28 at each end in contact with ferrule driving nuts 30 and 32, respectively, one at each end of compression fitting body 34. The compression fitting body 34 has a tapered mouth portion 36 surrounding tube 22 and a tapered mouth portion 38 surrounding thermocouple 24. The mouths cam ferrules into their respective concentric cylindrical member, 22 or 24, as the nuts 30 and 32 are axially advanced along the threaded ends 37 and 39, respectively, of the fitting body 34.

During service, leaks develop, usually at the point where ferrules 26 and 28 have been cammed by mouth 38 into radial swaged engagement with thermocouple 24.

The present invention is a fix or repair procedure for such a leaky seal joint. The method includes loosening and axially disassembling the fitting nut means or nuts 30 and 32 along the threaded ends 37 and 39 of the fitting body 34 and axially displacing the body from tube 22. The radial compression ferrules 26 and 28 associated with fitting body mouth 38 are then ground to remove them from engagement with the thermocouple 24. Thereafter, a step of wirebrushing to clean the surfaces of the various parts is preferably performed. A split metal sleeve 40 of thickness x and of a material which has a thermal coefficient of expansion similar to that of tube 22 and thermocouple 24 is preferably provided. Since the tube 22 and 24 are, typically, type 304 stainless steel, this is the preferable choice for the split collar 40. The collar material must permit the slit of the collar 40 to be spread for passage of the thermocouple 24 therethrough. The collar is then telescopically inserted into the end of tube 22 where it preferably is bottomed or seated against the tube end by means of an outwardly directed stop flange 42 on the collar 40 which limits the axial telescoping step.

Split rings of brazing material 44 and 46 are slipped around the thermocouple 24 and axially moved and seated against the ends of the tube 22 and the collar 40 (flange 42), respectively.

An electrical resistance heater of the type having two spaced electrodes and manufactured by Uniprise, Inc. of Plymouth, Conn., or any other suitable means, is then used to pass a current through the tube 22 adjacent its end until that region becomes "cherry-red", about 1850° F. The brazing material, which is an alloy of substantially 82 percent by weight gold and 18 percent by weight nickel, flows toward the heated tube 22 to fusion bond and seal the thermocouple 24, collar 40 and tube 22.

After the fusion bond and seal is complete, the fitting body 34 is moved axially into position with mouth 36 against ferrules 26 and 28, and threadedly engaged at threaded portion 38 to nut 30 with radially compressing cammed ferrules 26 and 28 still in clinching position on tube 22. Nut 32 is then advanced on threaded portion 39, without the previously removed ferrules 26 and 28 formerly associated with the fitting mouth 38 being present. Nut 32 merely protects the fusion seal and limits motion of body 34.

Thus, it will be seen that a seal joint repair for leaky reactor head member pressure stub tube instrumentation seals is provided by means of the disclosed novel combination of procedural steps.

What is claimed is:

1. A method of repairing a seal joint between a stud tube type instrumentation nozzle and an elongated instrument member having a cylindrical surface of a smaller outside diameter than the inside diameter of the tube, said elongated instrument member mounted concentrically within the instrumentation nozzle stud tube, said seal joint to be repaired including a compression fitting having a fitting body, fitting nut means and radial compression means, said method of repairing comprising the steps of:

loosening and axially disassembling the fitting nut means and the fitting body, removing the radial compression means from the elongated instrument member;

providing a collar between the inside of the tube and the outside surface of the elongated instrument member, providing brazing material adjacent the end of the tube and surrounding the elongated instrument member, heating the brazing material to provide a fusion bond and seal, and axially returning and assembling the fitting nut means and the fitting body to complete the seal joint.

2. The method of claim 1 in which the compression fitting radial compression means are ferrules and the step of removing includes grinding.

3. The method of claim 1 in which the brazing material is provided in the form of a split ring which is spread open.

4. The method of claim 1 in which the collar has an exposed end and a ring of brazing material adjacent the exposed end of the collar is provided as well as a ring of brazing material adjacent the end of the tube.

5. The method of claim 1 in which the step of heating is performed by use of electrical resistance of the tube.

6. The method of claim 1 in which the step of providing brazing material is preceded by a step of cleaning the instrument cylindrical surface and tube end to be bonded and sealed.

7. The method of claim 1 in which the brazing material provided is substantially 82 percent by weight gold and 18 percent by weight nickel.

8. The method of claim 1 in which the collar is split and is, therefore, provided between the inside of the tube and the outside surface of the elongated member by spreading the split, passing the elongated member through the slit and axially telescoping the collar into the tube end.

9. The method of claim 8 in which the collar has a stop flange which engages the tube end to limit the axial telescoping step.

* * * * *

UNITED STATES PATENT AND TRADEMARK OFFICE
CERTIFICATE OF CORRECTION

PATENT NO. : 4,945,623
DATED : August 7, 1990
INVENTOR(S) : Douglas S. Porter

It is certified that error appears in the above-indentified patent and that said Letters Patent is hereby corrected as shown below:

Column 3, Claim 1, line 1, after "a" delete "stud" and insert therefore --stub--;

Column 3, Claim 1, line 6, after "nozzle" delete "stud" and insert therefore--stub--.

Signed and Sealed this

Ninth Day of November, 1993

Attest:

BRUCE LEHMAN

*Attesting Officer*     *Commissioner of Patents and Trademarks*